(12) United States Patent
Becker et al.

(10) Patent No.: US 11,719,264 B2
(45) Date of Patent: Aug. 8, 2023

(54) METHOD FOR ASCERTAINING THE MOVEMENT OF AN ARMATURE OF AN ELECTRIC INTAKE VALVE

(71) Applicant: Robert Bosch GmbH, Stuttgart (DE)

(72) Inventors: Bernd Becker, Remseck A. N. (DE); Enrique Naupari, Kernen I. R. (DE); Gerald Gehmlich, Weinstadt (DE); Manuel Gil, Esslingen (DE); Sascha-Juan Moran Auth, Esslingen (DE); Jonas Hardt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 507 days.

(21) Appl. No.: 16/742,411

(22) Filed: Jan. 14, 2020

(65) Prior Publication Data

US 2020/0232487 A1    Jul. 23, 2020

(30) Foreign Application Priority Data

Jan. 17, 2019 (DE) .......................... 102019200572.1

(51) Int. Cl.
   *F15B 19/00* (2006.01)
   *F16K 31/02* (2006.01)
   *F16K 37/00* (2006.01)
   *F02D 41/20* (2006.01)

(52) U.S. Cl.
   CPC ............ *F15B 19/005* (2013.01); *F02D 41/20* (2013.01); *F16K 31/02* (2013.01); *F16K 37/0083* (2013.01); *F15B 19/002* (2013.01); *F15B 2211/426* (2013.01)

(58) Field of Classification Search
   CPC .. F15B 19/002; F15B 19/005; F15B 221/426; F16K 31/02; F16K 37/0083; F02D 41/20; F02D 41/221; F02D 2041/2024; F02D 2041/2055; F02D 2041/2058
   USPC .......................................................... 700/282
   See application file for complete search history.

(56) References Cited

U.S. PATENT DOCUMENTS

| | | | |
|---|---|---|---|
| 5,433,109 A * | 7/1995 | Mayer-Dick | F02D 41/221 73/114.49 |
| 5,592,921 A * | 1/1997 | Rehbichler | F02D 41/20 123/490 |
| 6,142,124 A * | 11/2000 | Fischer | F02D 41/247 361/155 |
| 7,089,915 B2 * | 8/2006 | Guenther | F02D 41/20 361/152 |
| 9,086,027 B2 * | 7/2015 | Lucano | F02D 41/20 |
| 9,159,480 B2 * | 10/2015 | Bauer | F02D 41/20 |
| 10,234,496 B2 * | 3/2019 | Nair | F02D 41/20 |
| 10,302,037 B2 * | 5/2019 | Schenck zu Schweinsberg | F02D 41/401 |

(Continued)

FOREIGN PATENT DOCUMENTS

| | | |
|---|---|---|
| DE | 4341797 A1 | 6/1995 |
| DE | 102015214600 A1 | 2/2017 |
| DE | 102015221912 A1 | 5/2017 |

*Primary Examiner* — William M McCalister
(74) *Attorney, Agent, or Firm* — Norton Rose Fulbright US LLP; Gerard Messina

(57) ABSTRACT

A method for ascertaining the movement of an armature of an electric intake valve, an electrical variable of the electric intake valve being controlled to predefined values with the aid of a two-position controller, a characteristic point in time of the movement of the armature being ascertained based on the switching behavior of the two-position controller.

7 Claims, 4 Drawing Sheets

(56) References Cited

U.S. PATENT DOCUMENTS 10,371,082 B1 * 8/2019 Dikeman ............... F02M 51/06
10,429,427 B2 * 10/2019 Fink ................... G01R 31/3275

* cited by examiner

METHOD FOR ASCERTAINING THE MOVEMENT OF AN ARMATURE OF AN ELECTRIC INTAKE VALVE

CROSS REFERENCE

The present application claims the benefit under 35 U.S.C. § 119 of German Patent Application No. DE 102019200572.1 filed on Jan. 17, 2019, which is expressly incorporated herein by reference in its entirety.

FIELD

The present invention is directed to a method for ascertaining the movement of an armature of an electric intake valve.

BACKGROUND INFORMATION

An electric intake valve is described in German Patent Application No. DE 10 2015 221 912 A1 in the case of which it is detected, by evaluating the current or voltage profile, that a path limitation is reached.

A method and a device for activating an electromagnetic consumer is furthermore described in German Patent Application No. DE 43 41 797 A1. This electromagnetic consumer is used to influence the fuel metering in a diesel internal combustion engine. To ascertain a switching instant of the electromagnetic consumer, a variable characterizing the activation signal is evaluated. The pulse length or the period duration of the activation signal is in particular used as the characteristic variable.

A fuel supply system that includes a high pressure pump having an electric intake valve is furthermore described in German Patent Application No. DE 10 2015 214 600 A1. The switching behavior of the electric intake valve is detected and conclusions are drawn about the fuel properties based on the switching behavior. The viscosity of the fuel is determined in particular.

SUMMARY

An example method according to the present invention may have the advantage over the related art that a characteristic point in time of the movement of the armature may be ascertained in a simple manner.

According to the present invention, an electrical variable of the electric intake valve is controlled to predefined values with the aid of a two-position controller to ascertain the movement of an armature of an electric intake valve and a characteristic point in time of the movement of the armature is ascertained based on the switching behavior of the two-position controller.

In one particularly advantageous specific embodiment, the start of the longest deactivation phase is used as the characteristic point in time. This point in time is correlated very well with the characteristic point in time.

It is particularly advantageous, if the electrical variable is the current flowing through the electric intake valve. This variable is measurable particularly easily. Furthermore, this variable is used for controlling and/or regulating other variables.

It is particularly advantageous that a test current is applied to the electric intake valve to ascertain the movement of the armature. In this way, the characteristic point in time may be carried out by evaluating the current even if a current is not applied to the electric intake valve for the purpose of actuating, i.e., opening or closing.

A point in time that corresponds to the starting point in time of the armature is advantageously used as the characteristic point in time. The starting point in time corresponds to the point in time, at which the armature starts moving.

In this case, no additional hardware, such as sensors, for example, is needed. The start, the progression, and the end of the downward movement of the armature of the electric intake valve may in particular be ascertained and made available in the control unit for further processing. By analyzing the downward movement of the armature, it is possible to optimize the activation of the electric intake valve. In addition to possible optimizations of the current profile, it is possible in particular to draw conclusions about the position of the valve. By verifying the valve opening, for example, the energization may be controlled in such a way that an unintentional maximum output is prevented. Such unintentional maximum outputs have always occurred until now, for example, when the valve does not fully reopen after a delivery, but is directly retightened.

In one further aspect, the present invention relates to a novel program code together with processing instructions for creating a computer program that is runnable on a control unit, in particular a source code together with compiling and/or linking instructions, the program code resulting in the computer program for carrying out all steps of one of the above-described methods, when it is converted into a runnable computer program, i.e., in particular compiled and/or linked, according to the processing instructions. This program code may be provided by a source code, in particular, that is downloadable from a server on the Internet, for example.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

The present invention is illustrated schematically in the figures on the basis of the specific embodiment and is described in greater detail below with reference to the figures.

Figure 1:
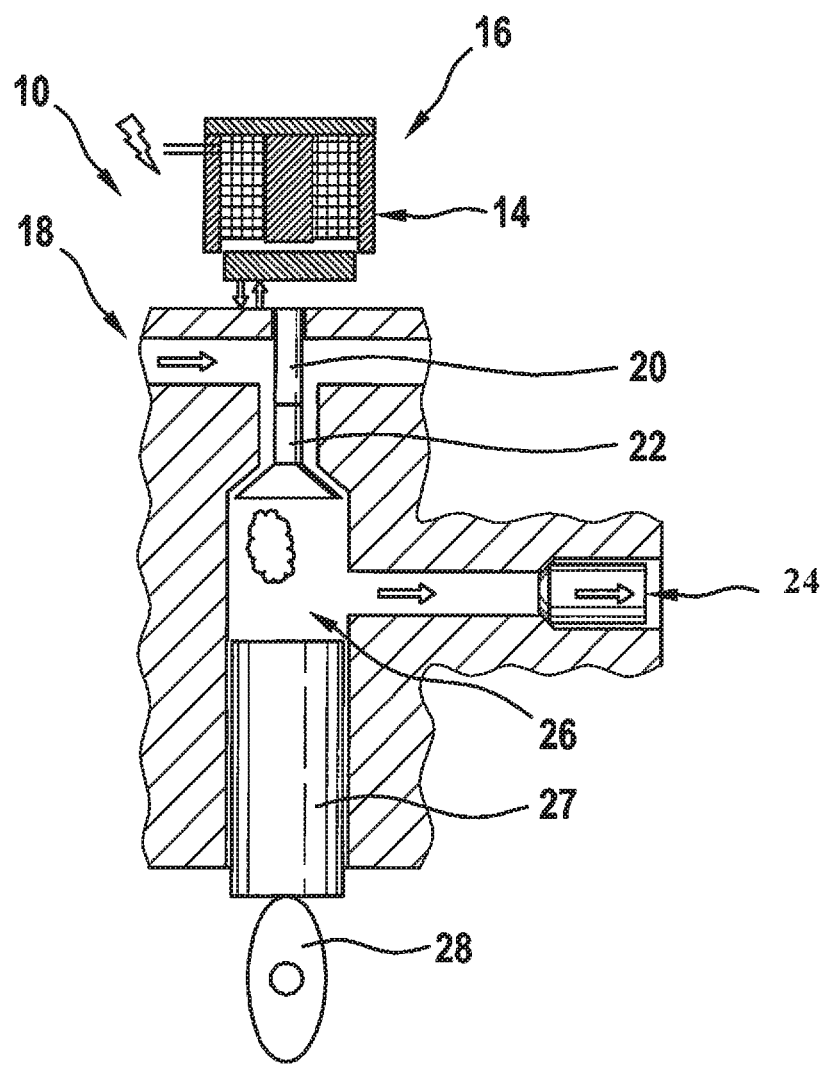
FIG. 1 shows the main elements of a high pressure pump.

In FIG. 1, a high pressure pump is illustrated that is identified overall by reference numeral 10. The illustration shows an electromagnet 14 that cooperates with a coil 16 and forms a magnetic circuit of an intake valve 18.

This intake valve 18, which is designed as an electric intake valve in this embodiment, includes a spring, electromagnet 14, coil 16, an armature 20, and an inlet valve 22, which is designed in this case as a hydraulic inlet valve. By activating electromagnet 14, armature 20 is moved via coil 16, in this illustration up and down. In this way, inlet valve 22 is actuated, i.e., opened and closed.

Furthermore, the illustration of FIG. 1 shows an outlet valve 24 that acts as a check valve and is designed as a hydraulic outlet valve, a pump chamber 26, a pump piston 27, and a pump cam 28 including a top dead center.

Illustrated high pressure pump 10 thus includes intake valve 18, outlet valve 24, pump chamber 26, pump piston 27, and pump cam 28.

Figure 2A:
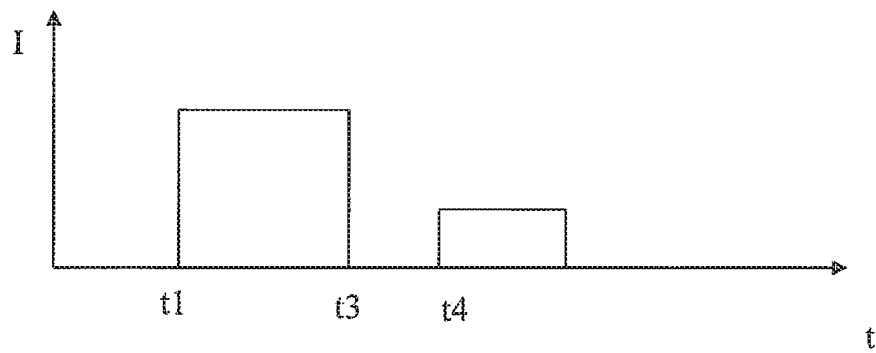
FIGS. 2A-2C show different signals plotted over time.
Figure 2B:
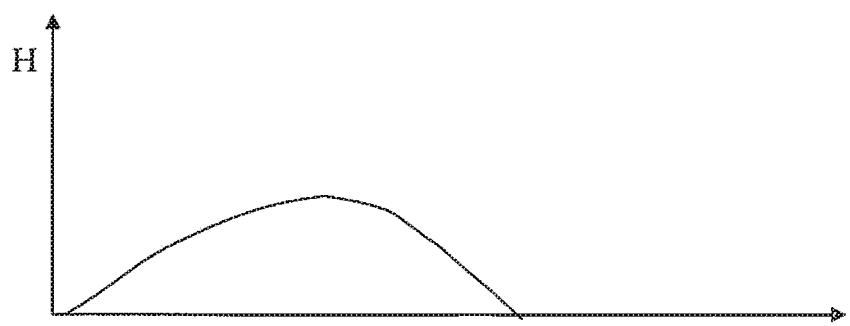
Figure 2C:
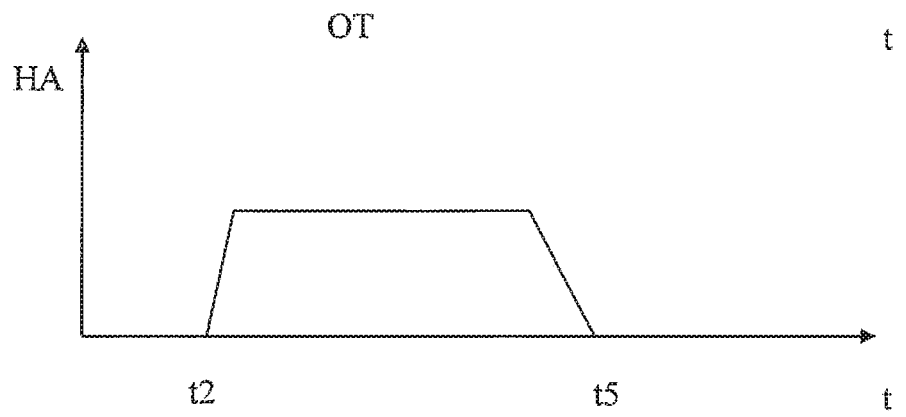
Figure 3A:
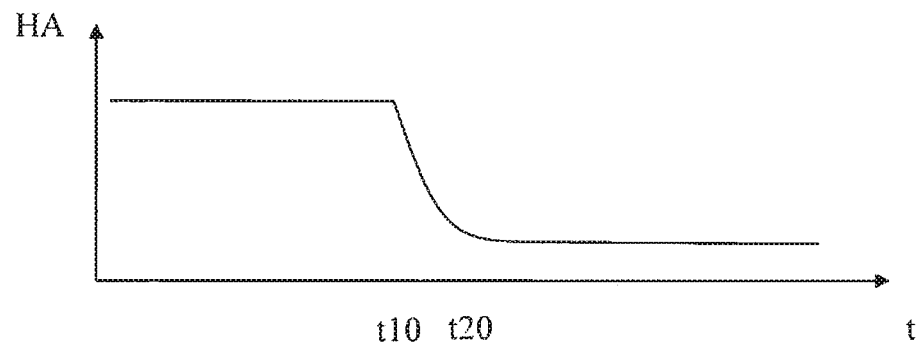
FIGS. 3A-3C show different signals plotted over time.
Figure 3B:
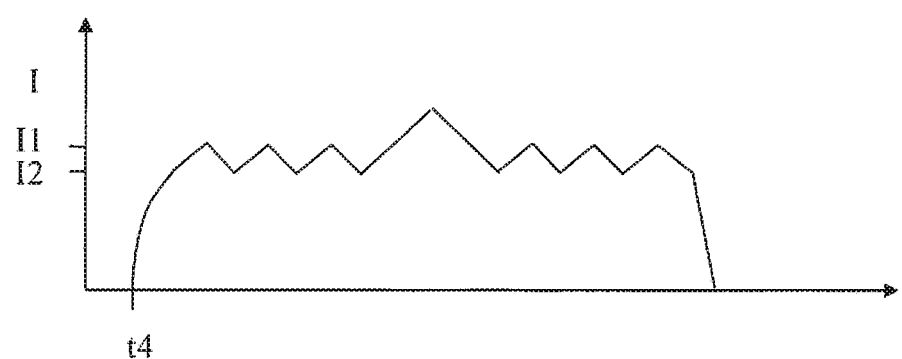
Figure 3C:
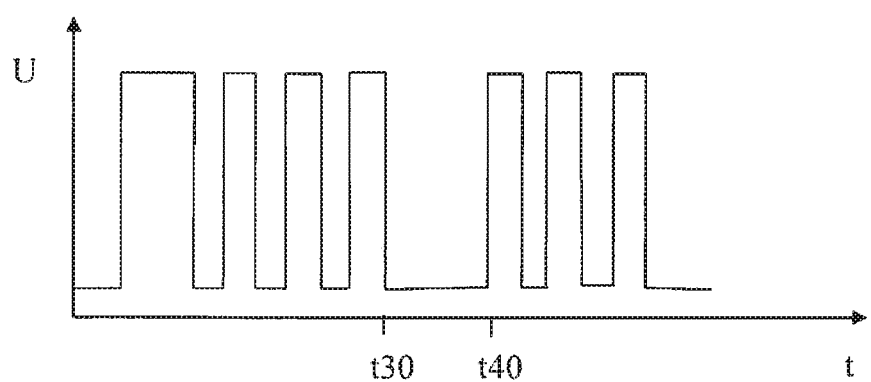

In FIG. 2A-2C, current I, which acts on electromagnet 14, is plotted in partial FIG. 2A, stroke H of cam 28 is plotted in partial FIG. 2B, and stroke HA of armature 20 is plotted in partial FIG. 3C over time t. At point in time t1, electromagnet 14 is energized. At point in time t2, armature 20 starts moving with a certain delay from its opened position into its closed position. As soon as armature 20 is in its closed position, inlet valve 22 also closes and pressure builds up in the pump chamber as a result of the cam movement. If the pressure in the pump chamber exceeds the pressure in the rail, outlet valve 24 opens and fuel flows from the pump chamber into the rail.

After reaching top dead center OT, the piston moves back down. This results in that outlet valve 24 closes, as soon as the pressure in the pump chamber falls below the rail pressure. At point in time t3, the energization of the electromagnet is terminated. Since there is still an elevated pressure in the pump chamber, inlet valve 22 remains in its closed position. Inlet valve 22 does not open and obtain its fully opened position at point in time t5 until the pressure in the pump chamber has dropped further.

The point in time at which a valve opens or closes is usually referred to as a switching instant. Various methods are known for measuring the switching instant of a valve. For example, the current flowing through the valve is controlled to a constant value and the profile of the voltage is evaluated at the valve. At the switching instant, the voltage profile has a discontinuity. Alternatively, the voltage may also be controlled to a constant value and the current may be correspondingly evaluated.

In one particularly advantageous specific embodiment, the current is controlled to a predefined setpoint value by the electromagnet with the aid of a two-position controller. It is provided in this case that a characteristic point in time of the movement of the armature is deduced based on the switching behavior of the two-position controller. The characteristic point in time is the opening point in time, the closing point in time of the valve, or the starting point in time of the armature, for example.

In valves that are open when no current is supplied, the evaluation of the opening point in time is unproblematic, since the valve is in this case provided with current. The opening point in time may also be correspondingly evaluated in injectors, since the current has not dropped to zero yet during the opening duration.

In this electric intake valve, this is not readily possible, since after cancellation of the energization the valve does not open until the pressure in the pump chamber has dropped to a certain value. At point in time t5, at which the electric intake valve opens, the current has dropped to zero.

For this reason, it is provided according to the present invention that starting from point in time t4, which lies significantly ahead of the opening of inlet valve 22, electromagnet 14 is energized again. Due to this energization, a measurement of the switching instant is possible when the armature opens. In this phase, a test current is applied to the electromagnet. The test current is selected in such a way that the evaluation of the characteristic point in time or the ascertainment of the switching behavior is possible, but the movement of the armature is not negatively affected.

A small section during the application of the test current starting from point in time t4 is illustrated in FIGS. 3A, 3B, and 3C.

In FIG. 3A, stroke HA of armature 20 is plotted over time.

In FIG. 3B, current I, which flows through coil 16, is also plotted over time.

In FIG. 3C, the voltage or the switching position of the two-position controller is plotted over time.

At the beginning, stroke HA of the armature is still in its closed position. In the illustration in the figure, this corresponds to the top position. The energization is started at point in time t4, just in time before the armature starts moving. This means that the two-position controller closes the circuit at point in time t4. This results in that the current rises to current value I1. When this current value is reached, the two-position controller opens and the current drops to value I2. When value I2 is reached, the two-position controller closes and the process is repeated multiple times. At point in time t10, the movement of the armature starts in the direction of its opened position. This point in time is also referred to as the starting point in time. When the two-position controller opens the circuit at point in time t30, the current still continues to rise. At point in time t20, at which the armature reaches its opened position, the current value assumes its maximum value. Subsequently, it drops back to value I2. This results in that at point in time t40, the two-position controller releases the current flow again. Subsequently, the sequence of the two-position controller constantly opening and closing the circuit is repeated until the two-position controller interrupts the current flow at the end of energization. The phases, in which the two-position controller interrupts the current flow, are referred to in the following as a deactivation phase.

It has been recognized according to the present invention that a deactivation phase is present during the movement of armature 20 from its closed into its opened position, i.e., from point in time t10 up to point in time t20. This deactivation phase is considerably longer than the other deactivation phases. Furthermore, it has been recognized according to the present invention that point in time t30, which corresponds to the start of the longest deactivation phase, is closely correlated to starting point in time t10 of the armature. According to the present invention, the start of the longest deactivation phase at point in time t30 is used as the characteristic point in time, in particular as the starting point in time of the armature.

Figure 4:
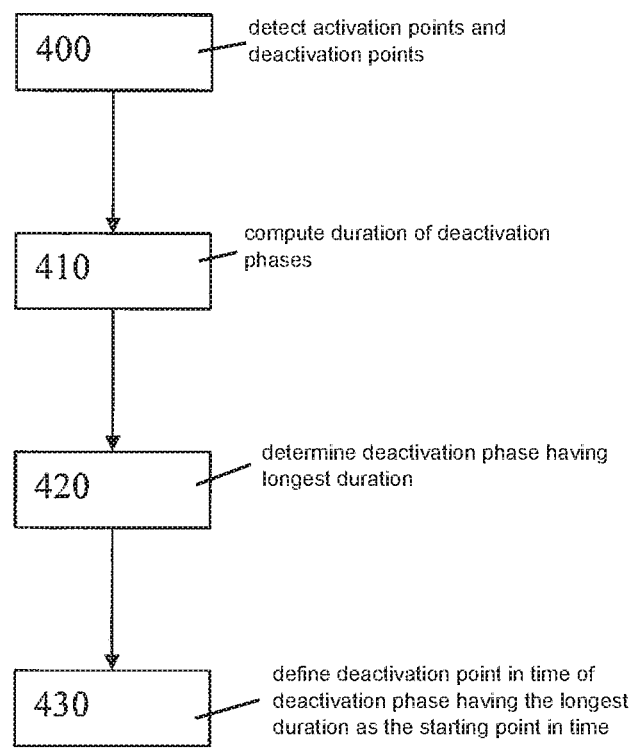
FIG. 4 shows a flow chart for the purpose of illustrating an example procedure according to the present invention.

To ascertain the starting point in time of the armature, one proceeds as illustrated in FIG. 4.

In a first step 400, activation points in time tei and deactivation points in time tai are detected every time the two-position controller is switched on and off. A deactivation point in time tai and subsequent activation point in time tei define a deactivation phase i in each case.

In subsequent step 410, duration di of particular deactivation phases i is computed in each case according to formula di=tai−tei.

In subsequent step 420, deactivation phase n having longest duration dn is determined. In step 430, deactivation point in time tan of deactivation phase n having longest duration dn is defined as the starting point in time.

What is claimed is:
1. A method for ascertaining a movement of an armature of an electric intake valve, the method comprising the following steps:
controlling an electrical variable of the electric intake valve to predefined values using a two-position controller;
determining a longest deactivation phase of the intake valve based on a deactivation phase duration calculation that depends on at least one deactivation time for the two-position controller and at least one activation time for the two-position controller; and ascertaining a characteristic point in time of the movement of the armature based on switching behavior of the two-position controller, wherein a start of only the longest deactivation phase is used as the characteristic point in time.

2. The method as recited in claim 1, wherein the electrical variable is current flowing through the electric intake valve.

3. The method as recited in claim 1, wherein a test current is applied to the electric intake valve to ascertain the movement of the armature.

4. The method as recited in claim 1, wherein the characteristic point in time corresponds to a starting point in time of the armature.

5. The method as recited in claim 4, wherein the starting point in time corresponds to a point in time at which the armature starts moving.

6. A non-transitory machine-readable memory medium on which is stored a computer program for ascertaining a movement of an armature of an electric intake valve, the computer program, when executed by a computer, causing the computer to perform the following steps:

controlling an electrical variable of the electric intake valve to predefined values using a two-position controller;

determining a longest deactivation phase of the intake valve based on a deactivation phase duration calculation that depends on at least one deactivation time for the two-position controller and at least one activation time for the two-position controller; and ascertaining a characteristic point in time of the movement of the armature based on switching behavior of the two-position controller, wherein a start of only the longest deactivation phase is used as the characteristic point in time.

7. A control unit configured to ascertain a movement of an armature of an electric intake valve, the control unit configured to:

control an electrical variable of the electric intake valve to predefined values using a two-position controller;

determining a longest deactivation phase of the intake valve based on a deactivation phase duration calculation that depends on at least one deactivation time for the two-position controller and at least one activation time for the two-position controller; and ascertain a characteristic point in time of the movement of the armature based on switching behavior of the two-position controller, wherein a start of only the longest deactivation phase is used as the characteristic point in time.

* * * * *